Figures 1, 2:
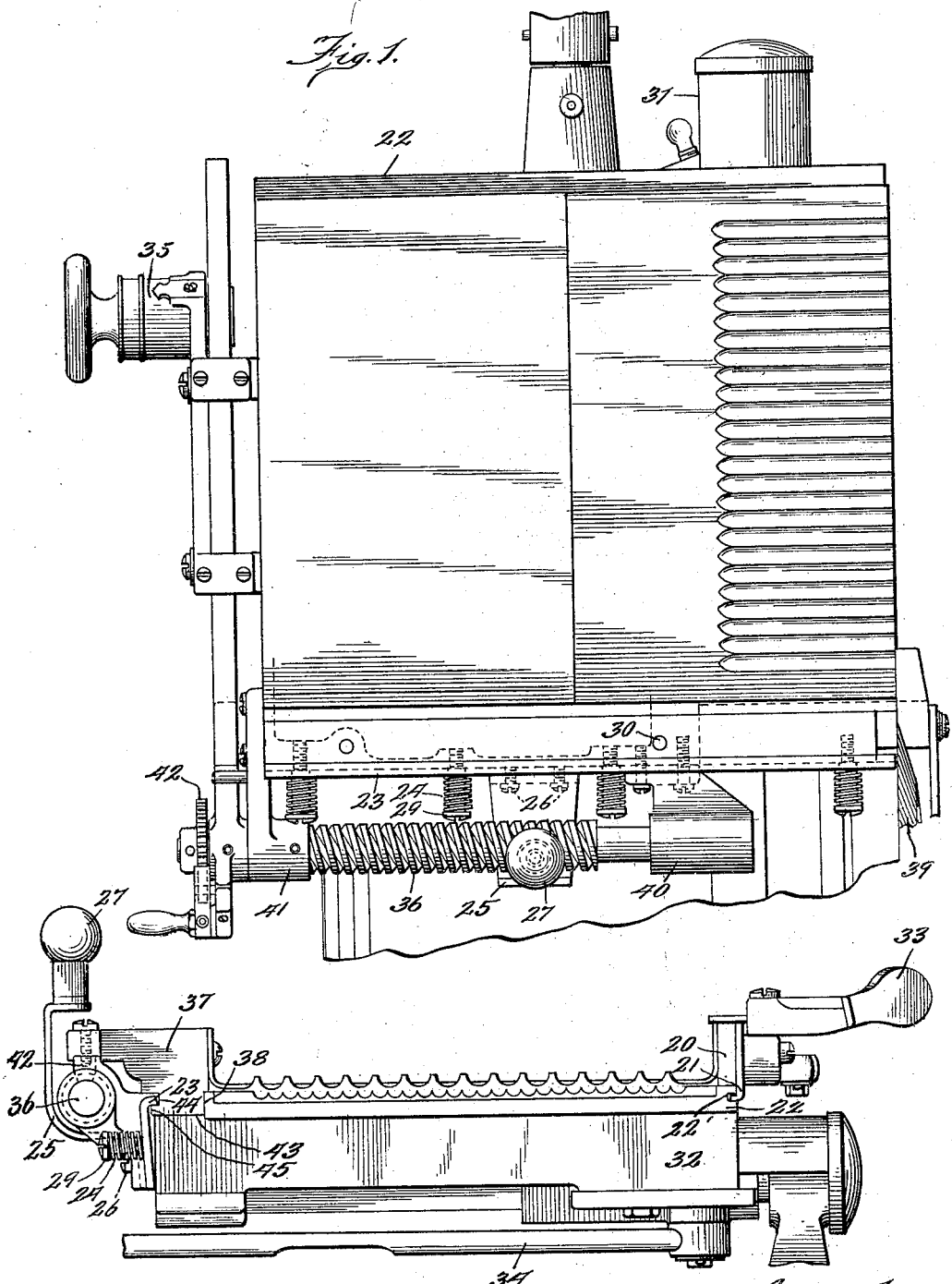

July 12, 1932.   H. STUKART   1,867,336
WORK SUPPORT GUIDE FOR SLICING MACHINES
Filed Dec. 21, 1927

Inventor:
Hendrik Stukart
By Niesen & Crane
Attys

Patented July 12, 1932

1,867,336

UNITED STATES PATENT OFFICE

HENDRIK STUKART, OF LA PORTE, INDIANA, ASSIGNOR TO U. S. SLICING MACHINE COMPANY, OF LA PORTE, INDIANA, A CORPORATION OF INDIANA

WORK SUPPORT GUIDE FOR SLICING MACHINES

Application filed December 21, 1927. Serial No. 241,467.

This invention relates to slicing machines and more particularly to the mounting of the meat table on the under table.

One object of this invention is to provide the under table with a simple and easily operated clamping and guiding plate for the meat table.

Another object of the invention is to provide an easily releasable means, on the side opposite the clamping plate, for preventing the meat table from lifting away from the under table.

Another object is to prevent binding between the meat and under table by providing a guide at one side of the table whose guiding faces are close together compared to the width between the guiding faces of guides spaced the full width of the table.

Other objects will appear as the description proceeds.

In the drawing—

Fig. 1 is a plan view of a slicing machine embodying my invention with the meat table removed; and Fig. 2 is an elevation as viewed from the right of Fig. 1 with the knife removed.

The under table 22 has a downwardly extending bearing or sleeve 32, slidably mounted on guides, to be reciprocated past the edge of the knife 39 by the usual mechanism including a crank, not shown, and a pitman 34. The feed screw 36 is journaled in brackets 40—41 carried by the under table and carries a ratchet 42 actuated in any suitable manner. 35 indicates generally a feed setting mechanism that has connected a connection, not shown, with the feeding mechanism to regulate the feed of the meat table toward the knife 39. 33 is a handle that is used to raise the nut 42′ from the feed screw, and 30 is a pin on the under table that serves as a stop for the meat table. The meat table has two side rails, the one bearing the numeral 20 is of usual width and the other rail 37 is somewhat wider. The plate 21 is attached to the side rail 20 and has an inturned end that rides loosely in a groove 22′ in the under table 22. The purpose of the retaining member 21 is to prevent the meat table 20 from lifting up on that side of the table. The other rail has a projecting portion carrying the feed nut 42′ and has a face 43 bearing against the under table below the upper face of the under table. The guide member or plate 23 is mounted on bolts 29 threaded into the under table 22. The coil springs 24 compressed between the heads of the bolts 29 and the plate or guide member 23 serve to hold the bent upper portion of the plate 23 into the groove 44 and on the ledge 45 formed in the rail 37. The plate 23 not only holds the face 43 of the rail 37 down against the under table but it also, together with the face 38 of the under table, constitutes a guide for the meat table.

A bracket 25 is attached to the plate 23 by screws 26 and has a handle 27 attached to its upper end.

It will be seen that the meat table is held and guided between guiding elements, the end of 23 and the face 38, that are spaced but a short distance apart. This prevents the binding action that often occurs when each of the pair of guides for the meat table are located at opposite sides of the table.

When it is desired to release the meat table from the under table it is only necessary to push on the handle or grip 27 which permits the withdrawal of the bent end of the plate 23 from the groove 44. The meat table can now be lifted up on this side and pushed free of the groove and tongue connection 21—22′ at the other side of the table.

I claim:—

1. In a slicing machine having an under table and a meat table mounted to slide over said under table; a guide rail located at one side of said meat table; co-operating bearing faces between the bottom of said rail and under table located below the top surface of said under table; cooperating bearing faces between one side of said rail and said under table, a ledge on the other side of said rail; a guide member carried by said under table releasably and slidably engaging said ledge, a ledge on the side of said undertable opposite said guide member; and a retaining member on the same side of said meat table slidably engaging said ledge on said under table, said retaining member preventing vertical movement of said meat table with respect to said under table but permitting sliding movement of said meat table on said under table and also permitting said meat table to be released from said under table by moving said meat table transverse to the direction of its sliding movement.

2. In a slicing machine having an under table and a meat table mounted to slide over said under table; a guide rail having a ledge on one side of said meat table; co-operating bearing surfaces between said under table and the bottom and one side of said rail; a plate having a tongue portion mounted on said under table; a spring associated with said plate to urge said tongue portion into co-operative sliding relation with said ledge; and a retaining member on the other side of said meat table slidably engaging said under table, said member preventing vertical movement of said meat table with respect to said under table but permitting sliding movement of said meat table on said under table and also permitting said meat table to be released from said under table by moving said meat table transverse to the direction of its sliding movement.

3. In a slicing machine having an under table and a meat table mounted to slide over said under table; a grooved guide rail located at one side of said meat table; co-operating bearing faces between the bottom of said rail and under table located below the top surface of said under table; co-operating bearing faces between one side of said rail and said under table; a plate having a tongue portion mounted on said under table; a spring associated with said plate to urge said tongue portion into engagement with said groove; and a retaining member on the other side of said meat table slidably engaging said under table, said member preventing vertical movement of said meat table with respect to said under table but permitting sliding movement of said meat table on said under table and also permitting said meat table to be released from said under table by moving said meat table transverse to the direction of its sliding movement.

4. In a slicing machine having an under table and a meat table mounted to slide over said under table; a guide rail having a ledge on one side of said meat table; co-operating bearing surfaces between said under table and the bottom and one side of said rail; a plate having a tongue portion mounted on said under table; a spring associated with said plate to urge said tongue portion into co-operative sliding relation with said ledge; and a member carried by the other side of said meat table having its end turned inwardly toward said guide rail to slidably engage a groove in said under table.

5. In a slicing machine having an under table and a meat table mounted to slide over said under table; a grooved guide rail located at one side of said meat table; co-operating bearing faces between the bottom of said rail and under table located below the top surface of said under table; co-operating bearing faces between one side of said rail and said under table; a plate having a tongue portion mounted on said under table; a spring associated with said plate to urge said tongue portion into engagement with said groove, and a member carried by the other side of said meat table having its end turned inwardly toward said guide rail to slidably engage a groove in said under table.

6. In a slicing machine having an under table and a meat table mounted to slide over said under table; a guide rail having a ledge on one side of said meat table; co-operating bearing surfaces between said under table and the bottom and one side of said rail; a plate having a tongue portion mounted on said under table; a spring associated with said plate to urge said tongue portion into co-operative sliding relation with said ledge, and a bracket having a handle portion attached to said plate to disengage said tongue from said ledge, said handle portion being of a length to impart a considerable leverage on said plate for releasing the same.

7. In a slicing machine having an under table and a meat table mounted to slide over said under table; a guide rail having a ledge on one side of said meat table; co-operating bearing surfaces between said under table and the bottom and one side of said rail; a plate having a tongue portion mounted on said under table; a spring associated with said plate to urge said tongue portion into co-operative sliding relation with said ledge; a retaining member on the other side of said meat table slidably engaging said under table, said member preventing vertical movement of said meat table with respect to said under table but permitting sliding movement of said meat table on said under table and also permitting said meat table to be released from said under table by moving said meat table transverse to the direction of its sliding movement, and a bracket having a handle portion attached to said plate to disengage said tongue from said ledge.

8. In a slicing machine having an under table and a meat table mounted to slide over said under table, a guide rail on one side of said meat table having a ledge thereon, a plate having a projection thereon mounted on said under table, spring means urging said plate toward said rail to position said projection over said ledge, a bracket having a handle thereon attached to said plate, and a plate having an inturned projection on the side of said meat table opposite said guide rail, said under table having a ledge thereon beneath which said inturned projection slides.

9. In a slicing machine, the combination with an under table, a meat table mounted to slide relatively to said under table and be guided thereby, a relatively narrow guide rail on said meat table located wholly at one side thereof, guiding elements on said under table for holding said meat table against vertical movement and engaging said rail to guide said meat table along a predetermined path, and a member carried by the other side of said meat table having a portion turned inwardly toward said guide rail and rigidly engaging the side of said under table to prevent twisting movement of said meat table in the plane of its feeding movement.

10. In a slicing machine, the combination with an under table, a meat table mounted to slide over said under table, a plate mounted on said under table, a narrow guide on said meat table arranged between said plate and a rigid portion of said under table opposed to said plate, a tongue portion on said plate, said meat table having a groove in one edge thereof adjacent said tongue portion, said tongue portion being adapted to be arranged in said groove, a feed mechanism for feeding said meat table relative to said under table, and an operating abutment on said plate for releasing said plate independently of said feed mechanism and said feed mechanism being releasable independently of the releasing means for said plate.

11. In a slicing machine, the combination with an under table, of recesses formed at the opposite sides of the upper surface of said under table to provide guiding faces facing outwardly toward the edges of said under table, a meat table having rigid cooperating guiding faces for engaging said faces on the said under table, a rigid projection on said meat table for preventing upward movement of one edge of said meat table, a releasable plate for engaging the opposite side of said meat table from that which carries said projection for preventing upward movement of that side of said meat table, said plate being releasably held in engagement with said meat table, and means for releasing said plate, said guide faces on said meat table and under table being rigidly held in abutting relation with each other to prevent twisting movement of said meat table in the plane of its feeding movement, and said releasable plate being for the purpose of exerting a frictional retardation to the movement of said meat table.

In testimony whereof I have signed my name to this specification on this 15th day of December, A. D 1927.

HENDRIK STUKART.